(12) United States Patent
Daellenbach et al.

(10) Patent No.: US 8,423,940 B2
(45) Date of Patent: Apr. 16, 2013

(54) EARLY NOISE DETECTION AND NOISE AWARE ROUTING IN CIRCUIT DESIGN

(75) Inventors: Lukas Daellenbach, Altdorf (DE); Elmar Gaugler, Stuttgart (DE); Wilhelm Haller, Remshalden (DE); Ralf Richter, Unterhausen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/209,504

(22) Filed: Aug. 15, 2011

(65) Prior Publication Data

US 2013/0047130 A1    Feb. 21, 2013

(51) Int. Cl.
*G06F 17/50*    (2006.01)

(52) U.S. Cl.
USPC ............ 716/115; 716/113; 716/126; 716/139

(58) Field of Classification Search .................. 716/113, 716/115, 126, 139
See application file for complete search history.

(56) References Cited

U.S. PATENT DOCUMENTS

| | | | |
|---|---|---|---|
| 6,615,395 B1 * | 9/2003 | Hathaway et al. ............ | 716/113 |
| 7,017,128 B2 * | 3/2006 | Audet et al. .................. | 716/115 |
| 7,062,737 B2 | 6/2006 | Telelbaum | |
| 7,225,420 B2 * | 5/2007 | Cress ........................... | 716/136 |
| 7,363,607 B2 * | 4/2008 | Birch et al. ................... | 716/113 |
| 7,454,731 B2 * | 11/2008 | Oh et al. ....................... | 716/113 |
| 7,472,367 B1 * | 12/2008 | Xie et al. ...................... | 716/132 |
| 7,600,208 B1 * | 10/2009 | Sharma et al. ............... | 716/120 |
| 7,900,179 B2 * | 3/2011 | Chiu et al. .................... | 716/126 |
| 7,949,979 B1 * | 5/2011 | Alexander .................... | 716/115 |
| 2004/0107411 A1 | 6/2004 | Saxena et al. | |
| 2007/0028201 A1 * | 2/2007 | Mehrotra et al. .............. | 716/12 |
| 2008/0028352 A1 | 1/2008 | Birch et al. | |
| 2008/0148213 A1 | 6/2008 | Belaidi et al. | |
| 2009/0132982 A1 * | 5/2009 | Kotecha et al. ................. | 716/6 |
| 2009/0254874 A1 * | 10/2009 | Bose ............................... | 716/6 |
| 2009/0300565 A1 * | 12/2009 | Chiu et al. ....................... | 716/6 |
| 2010/0017186 A1 * | 1/2010 | Kim et al. ...................... | 703/14 |
| 2011/0214100 A1 * | 9/2011 | McElvain ..................... | 716/130 |
| 2011/0307850 A1 * | 12/2011 | Dartu et al. ................... | 716/108 |

OTHER PUBLICATIONS

Sapatnekar et al., "Simultaneous Shield and Buffer Insertion for Crosstalk Noise Reduction in Global Routing," IEEE Transactions on Very Large Scale Integration (VLSI) Systems, v 15, n 6, 624-36, Jun. 2007.

* cited by examiner

*Primary Examiner* — Naum Levin
(74) *Attorney, Agent, or Firm* — Yudell Isidore Ng Russell PLLC

(57) ABSTRACT

A computerized method, data processing system and computer program product reduce noise for a buffered design of an electronic circuit which was already placed and routed. For all areas between a power stripe and a ground stripe (half bay) in the design, the shapes are divided in different criticality levels. The shapes are rearranged based on their criticality level such that shapes with higher criticality level are placed closer to the stripes than those with lower criticality level.

20 Claims, 7 Drawing Sheets

| ---->Sink | Stack Phase | | DDelay | | DSlack | TotWireCap (wc/bc/norm) | | TotCoupCap (wc/bc/norm) | | | Net | | Vdd |
|---|---|---|---|---|---|---|---|---|---|---|---|---|---|
| ---->AppNet | Slack | Edge | Mode | DDelay | DSlew | DSlack | CoupCap | Delay | WinStart | WinEnd | Slew | NoisePeak | NoiseArea | |
| tubuf_io0_cmts_xu_result&1b33/dout | 0.12 M1x2@L | | | | -4.35 | -/-/131.22 | | -/-/23.65 | | | io0_cmts_xu_result& | | |
| ----> | 0.12 | R | S | 2.12 | 4.90 | -4.35 | | 8.11 | 152.98 | 250.78 | 78.24 | 0.03 | 2.55 | 0.93 |
| tucmt0\turn\tucom/io_cmts_xu_result&1(33) | | | | | | | | | | | | | | |
| ----> io0_cmts_xu_result&1(45) | | | | | | | 5.21 | | 199.48 | 250.78 | 69.76 | 0.01 | 1.12 | 0.93 |
| ----> io0_cmts_xu_result&1(50) | | | | | | | 3.15 | | 216.19 | 250.78 | 40.06 | 0.01 | 0.63 | 0.93 |
| ----> tucmt0\tuc\addr_c2(32) | | | | | | | 1.29 | | 168.91 | 237.75 | 68.57 | 0.00 | 0.25 | 0.93 |
| ----> io0_cmts_xu_result&1(46) | | | | | | | 1.25 | | 197.57 | 250.78 | 78.88 | 0.00 | 0.25 | 0.93 |
| ----> io0_cmts_xu_result&1(36) | | | | | | | 1.17 | | 191.96 | 250.78 | 72.10 | 0.00 | 0.22 | 0.93 |
| ----> tucmt0\cmp_csto_st_status_p&1(5) | | | | | | | 0.39 | | 175.73 | 241.52 | 65.29 | 0.00 | 0.07 | 0.93 |
| ----> tubuf_io0_cmts_xu_result&1_b33/din | 98.63 | R | S | 2.05 | 4.74 | -10.36 | | 10.21 | 155.03 | 253.03 | 78.40 | 0.03 | 2.48 | 0.93 |
| ----> io0_cmts_xu_result&1(45) | | | | | | | 5.21 | | 202.44 | 253.03 | 69.76 | 0.01 | 0.99 | 0.93 |
| ----> io0_cmts_xu_result&1(50) | | | | | | | 3.15 | | 219.85 | 253.03 | 40.06 | 0.01 | 0.60 | 0.93 |
| ----> tucmt0\tuc\addr_c2(32) | | | | | | | 1.29 | | 168.77 | 237.60 | 68.57 | 0.00 | 0.27 | 0.93 |
| ----> io0_cmts_xu_result&1(46) | | | | | | | 1.25 | | 191.09 | 253.03 | 78.88 | 0.00 | 0.28 | 0.93 |
| ----> io0_cmts_xu_result&1(36) | | | | | | | 1.17 | | 191.94 | 253.03 | 72.10 | 0.00 | 0.24 | 0.93 |
| ----> tucmt0\cmp_csto_st_status_p&1(5) | | | | | | | 0.39 | | 175.06 | 240.85 | 65.29 | 0.00 | 0.10 | 0.93 |
| ----> tucmt0\turn\turnbr\wt0_data(37) | 150.16 | R | S | 2.27 | 5.27 | -4.55 | | 8.53 | 153.25 | 251.05 | 78.24 | 0.04 | 2.73 | 0.93 |
| ----> io0_cmts_xu_result&1(45) | | | | | | | 5.21 | | 198.08 | 251.05 | 69.76 | 0.01 | 1.31 | 0.93 |
| ----> io0_cmts_xu_result&1(50) | | | | | | | 3.15 | | 216.57 | 251.05 | 40.06 | 0.01 | 0.63 | 0.93 |
| ----> tucmt0\tuc\addr_c2(50) | | | | | | | 1.29 | | 169.02 | 237.85 | 68.57 | 0.00 | 0.25 | 0.93 |
| ----> io0_cmts_xu_result&1(46) | | | | | | | 1.25 | | 197.51 | 251.05 | 78.88 | 0.00 | 0.25 | 0.93 |
| ----> io0_cmts_xu_result&1(36) | | | | | | | 1.17 | | 191.96 | 251.05 | 72.10 | 0.00 | 0.22 | 0.93 |
| ----> tucmt0\cmp_csto_st_status_p&1(5) | | | | | | | 0.39 | | 175.84 | 241.63 | 65.29 | 0.00 | 0.07 | 0.93 |

EARLY NOISE DETECTION AND NOISE AWARE ROUTING IN CIRCUIT DESIGN

BACKGROUND

1. Technical Field

The present disclosure relates to the design of very large scale integrated (VLSI) circuits, and more particularly to improved routing of electric circuits on an integrated circuit chip to avoid noise coupling in noise sensitive areas.

2. Description of the Related Art

In the manufacture of microelectronics, circuits and other logic must be placed on chips and routed under certain wireability and timing constraints. Specifically, the electric circuits must be placed and routed in such a way that all wiring corresponding to the nets joining the electric circuits can be placed and connected as required. As a rule, routing begins after a floor plan has been laid out and the electric circuits have been placed on the chip. Routing is generally split into a global routing step followed by a detailed routing step. During global routing, a complete set of instructions is provided according to which the detailed router is to place actual wiring of every net. The objectives of global routing include a minimization of total interconnect length, a maximization of the probability that the detailed router can complete the routing, and a minimization of critical path delay. Thus, the global routing step determines the channels to be used for each interconnect. Using this information, the detailed router determines the exact location and layers for each interconnect. Depending on the quality of placement and of global routing as well as on local wiring requirements, routing often produces areas with wiring that is susceptible to noise from adjacent wiring, which has a negative effect on the design's performance.

BRIEF SUMMARY

Disclosed are a method, a data processing system and a computer program product for rearranging wiring of a buffered integrated circuit design to mitigate noise due to coupling in congested area. Wires that are subject to noise are rearranged within an orthogonal area of a certain wire level between a ground stripe and an adjacent VDD (voltage drain drain) stripe.

In one embodiment, the present disclosure provides a computer-implemented method for noise aware routing in an integrated circuit chip design. An uplift timing analysis is performed using a route-based extractor for a given route placement of nets connecting electric circuits of an integrated circuit chip design. In particular, after Routing Based Extraction (RBE), the uplift timing analysis calculates the effect of the real wire capacities and the coupling effects of long parallel wires on the timing behavior of the circuits. Thus the uplift timing analysis shows if noise is acceptable (no negative effect on timing constraints) or not. Unacceptable noise indicates an affected shape. Affected shapes are located in a halfbay between a ground stripe and a power (vdd) stripe. Identifying a halfbay is achieved by assuming an orthogonal power grid on each level of metal. Ground (Gnd) and power (Vdd) stripes are regularly interleaved. G-route and C-route are used to assure that all signal wires or traces fit within the halfbay, thereby fulfilling the given constraints of wire width and wire spacing. During routing, the router has no knowledge about timing and switching of the signals and thus cannot take noise reduction actions at this early stage of physical design. Instead, the affected shapes are determined based upon a list of aggressor and victim nets and a proximity parameter. The affected shapes are prioritized into different prioritized based on coupling uplift values from the uplift timing analysis, giving a higher priority to shapes having a higher coupling uplift value. The affected shapes are rearranged within the integrated circuit chip design according to the respective priority.

In another embodiment, the present disclosure provides a data processing system for noise aware routing in an integrated circuit chip design. A computer-readable storage medium stores given routed placement of nets connecting electric circuits of an integrated circuit chip design. Program code on the computer-readable storage medium executes on a processor to cause the data processing system to perform an uplift timing analysis using a route-based extractor for the given routed placement of nets. Affected shapes are located in a halfbay between a ground wire and a vdd wire based on a list of aggressor and victim nets and a proximity parameter. The affected shapes are prioritized into different priorities based on coupling uplift values from the uplift timing analysis, giving a higher priority to shapes having a higher coupling uplift value. The affected shapes are rearranged within the integrated circuit chip design according to the categorization.

In a further embodiment, the present disclosure provides a computer program product for noise aware rearranging in an integrated circuit chip design. When executed by a processor of a data processing system, program code embedded on a computer usable storage medium when causes the processor of the data processing system to perform functions of performing an uplift timing analysis using a route-based extractor for a given routed placement of nets containing electric circuits of an integrated circuit chip design for an integrated circuit chip. Affected shapes are located in a halfbay between a ground wire and a vdd wire based on a list of aggressor and victim nets and a proximity parameter. The affected shapes are prioritized into different priorities based on coupling uplift values from the uplift timing analysis, giving a higher priority to shapes having a higher coupling uplift value. The affected shapes are rearranged within the affected halfbay design according to the respective priority.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present innovation will become apparent in the following detailed written description.

BRIEF DESCRIPTION OF THE DRAWINGS

The description of the illustrative embodiments is to be read in conjunction with the accompanying drawings, wherein:

FIG. 4 provides a tabular example results of uplift timing analysis, according to one or more embodiments;

DETAILED DESCRIPTION

Figure 1:
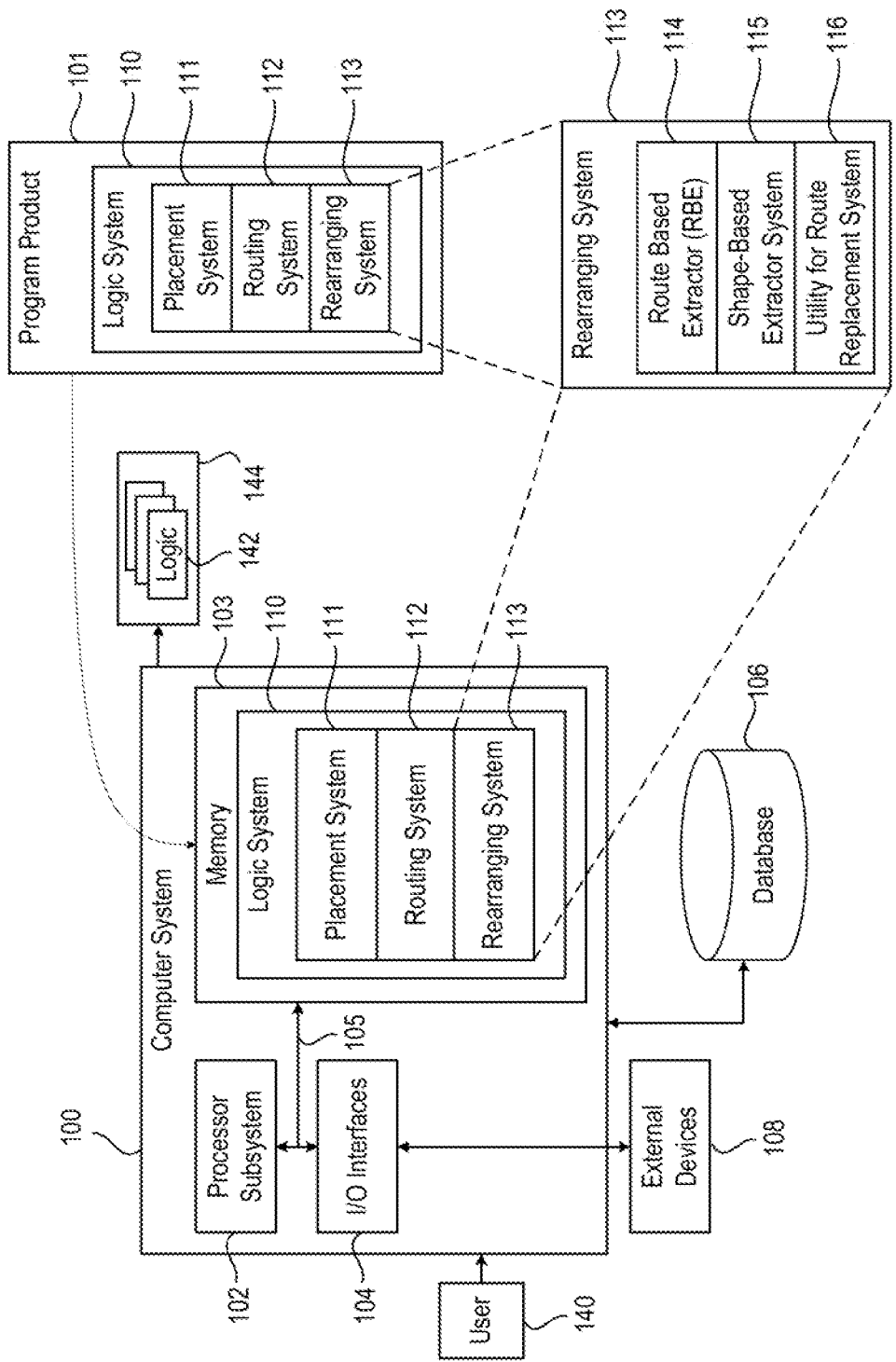
FIG. 1 provides a block diagram representation of a data processing system for noise aware routing in an integrated circuit design, according to one or more embodiments.

The illustrative embodiments provide a computerized method, data processing system and computer program product to reduce noise for a buffered design of an electronic circuit which has already been placed and routed. For all areas between a power (vdd) stripe and a ground (gnd) stripe, that is a half bay, in the design, the shapes are divided in different criticality levels. The shapes are rearranged based on their criticality level such that shapes with higher criticality level are placed closer to the gnd or vdd stripes than those with lower criticality level. Thereby, the present innovation avoids a time-consuming and error-prone manual approach to rearranging the shapes.

In the following detailed description of exemplary embodiments of the innovation, specific exemplary embodiments in which the innovation may be practiced are described in sufficient detail to enable those skilled in the art to practice the innovation, and it is to be understood that other embodiments may be utilized and that logical, architectural, programmatic, mechanical, electrical and other changes may be made without departing from the spirit or scope of the present innovation. The following detailed description is, therefore, not to be taken in a limiting sense, and the scope of the present innovation is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the described embodiments. The presented embodiments may thus be implemented with different nomenclature/terminology utilized to describe the components/devices/parameters herein, without limitation. Each term utilized herein is to be given its broadest interpretation given the context in which that terms is utilized.

As further described below, implementation of the functional features of the innovation is provided within processing devices/structures and involves use of a combination of hardware, firmware, as well as several software-level constructs (e.g., program code). The presented figures illustrate both hardware components and software components within example data processing.

Referring now to FIG. 1, an example computer system 100 within which aspects of the present innovation are implemented is shown. Specifically, the present innovation can be implemented as a computer system 100 and/or program product 101 for placing and routing electric circuits in integrated circuit chip design. This allows user 140 to run simulations before performing logic placement. As depicted, computer system 100 generally comprises a processor subsystem 102, a memory 103, an input/output (I/O) interface 104, a bus or interconnect subsystem 105, a database 106, as well as external devices 108.

Processor subsystem 102 encompasses the central processing unit (CPU) as well as any secondary processing devices, for example arithmetic processing unit, coupled to the CPU by the bus subsystem 105. Processor subsystem may comprise a single processing unit, or be distributed across one or more processing units in one or more locations, e.g., on a client and server. Memory 103 may comprise any known type of data storage and/or transmission media, including magnetic media, optical media, Random Access Memory (RAM), read-only memory (ROM), a data cache, a data object, etc. Moreover, memory 103 may reside at a single physical location, comprising one or more types of data storage, or be distributed across a plurality of physical systems in various forms.

I/O interface 104 may comprise any system for exchanging information from an external source. External devices 108 may comprise any known type of external device, including speakers, a Cathode Ray Tube (CRT), Light Emitting Diode (LED) screen, hand-held device, keyboard, mouse, voice recognition system, speech output system, printer, monitor, facsimile, pager, etc. Bus or interconnect subsystem 105 provides a communication link between each of the components in the computer system 100 and likewise may comprise any known type of transmission link, including electrical, optical, wireless, etc. In addition, although not shown, additional components, such as cache memory, communication systems, system software, etc., may be incorporated into computer system 100.

Database 106 provides storage for information necessary to carry out the present invention. Such information could include, inter alia: (1) data, showing the influence of noise on timing behavior, congestion data; (2) potential implementations; (3) wiring quality data; etc. Database 106 may include one or more storage devices, such as a magnetic disk drive or an optical disk drive. In another embodiment database 106 includes data distributed across, for example, a local area network (LAN), wide area network (WAN) or a storage area network (SAN) (not shown). Database 106 may also be configured in such a way that one of ordinary skill in the art may interpret it to include one or more storage devices. Moreover, it should be understood that database 106 could alternatively exist within computer system 100.

Stored in memory 103 is logic system 110. As depicted, logic system 110 generally includes placement system 111, Routing system 112 (comprising global routing system and detailed routing system), and a noise aware rearranging system 113.

Rearranging system 113 comprises a Route-Based Extractor (RBE) 114, a shape-based extractor system 115 and a utility for route replacement system 116. RBE 114 is the route based extractor, and RBE delivers preliminary capacity data/values about real wires in layout. In the described embodiment, the wires are not yet connected to their source and sink(s) (a process which is done by d-route); however, RBE data is sufficient for noise analysis for long wires, as the small wire pieces that connect to the pins can be neglected. A subsequent uplift timing analysis shows the noise effect on timing behavior.

Each of the software modules 111 through 116 is comprised of a set of instructions which are encoded in memory 103 as computer readable program code and executable by one or more processors within processor subsystem 102. Typically, the software modules 111 through 116 will be stored in auxiliary memory of memory subsystem 103 prior to the execution thereof. External device 108, e.g., a CD-ROM or file transfer software, is used to copy the modules 111 through 116 into the auxiliary memory of memory subsystem 103.

The functionality provided by the software modules 111 through 116 may be encoded in the memory 103 and/or in computer usable medium as discrete programs, each containing computer readable program code. Alternately, the functionality provided by the software modules 111 through 116 may be encoded in the memory 103 and/or in computer usable medium as separate subroutines of a single computer program containing plural computer readable program subcodes. Furthermore, while any of the software modules 111 through 116 may be executed separately. Any of the software modules 111 through 116 may call any other one of the software modules 111 through 116 to perform certain functions on its behalf.

In an exemplary aspect, the utility 116 of the rearranging system 113 of the computer system 100 provides and implements the following functions:
  (a) performing an uplift timing analysis using the RBE extraction system 114 for logic 142 of a given routed placement of nets for an integrated circuit design 144 containing electric circuits of an integrated circuit chip design for an integrated circuit chip;
  (b) locating affected shapes in a halfbay between a ground stripe and a vdd stripe based on a list of aggressor and victim nets and a proximity parameter, using the information from the uplift timing analysis;
  (c) prioritizing the affected shapes based on coupling uplift values from the uplift timing analysis, giving a higher priority to a higher coupling uplift value; and
  (d) rearranging the affected shapes within the integrated circuit chip design according to the respective priority.

In an exemplary aspect, CADENCE tools of a RBE (Routed Based Extractor) and Manufactoring Aware Router (MAR) (Cadence Router) are used to rearrange c route segments within a so-called half bay (the distance between power stripes and ground stripes).

In an exemplary aspect for extraction and timing, a Space-based router and chip optimizer uses the engines from two Cadence products, Encounter QRC (Quality Resistor Capacitance, feel free to inform yourself on the Cadence Homepage under http://www.cadence.com/products/di/qrc_extraction/pages/default.aspx) Extraction XL and Encounter Timing System, to perform gate-level Resistor Capacitance (RC) parasitics extraction, delay calculation, and timing analysis. These functions are used to generate timing reports, perform timing preserved optimization, and perform timing centric routing.

For RC extraction during manufacturing, processes such as lithography, etching, and chemical mechanical polishing can create differences between the layout drawn by designers and the manufactured design. Accurate prediction of circuit behavior in deep submicron silicon requires the modeling of these manufacturing effects including the following:
  Wire-edge enlargement, which is the effective change to a wire's width as a function of its width and spacing to its neighbors due to its optical proximity to neighboring wires;
  Resistivity as a function of wire width, which represents the effective variations in a wire's resistivity because of dishing, slotting, and cladding thickness; and
  Erosion, which refers to the change in a wire's thickness as a function of metal density in a portion of a chip.

Space-based router and chip optimizer computes the manufactured dimensions of a wire (width and thickness) and applies parasitic models to the resulting wire. Space-based router and chip optimizer also uses the gate-level parasitic resistance and capacitance extractor engine from Encounter QRC to model manufacturing effects on resistance, capacitance, or both.

RC extraction flow comprises initializing the extractor and extracting the nets. When initializing the extractor, an extraction license is checked out if not already checked out. Then the extraction engine is initialized. Initialization includes loading an extraction technology file and mapping open access database layers.

To run the extractor, a binary-format extraction technology file is loaded containing fabrication process information representing the manufacturing effects. Additional technology files can be loaded with a command. Each of these technology files can be associated with an open access analysis point name. In one or more embodiments mapping open access database layer is needed when the layer names in the extractor's technology file do not match the layer names in the open access database. A command can be used to extract nets and to produce an open access parasitic network for each of the nets. Power, ground, and unrouted nets are automatically ignored. If multiple technology files or process variations are loaded, the extractor will extract each net N times and produce N parasitic networks written to N analysis points. In one or more embodiments, arguments for the extract command can specify options including the following: the nets to extract as all nets or nets in a given set; the type of extraction as a decoupled RC network, coupled RC network, lumped coupling RC network, total lumped capacitance, or resistance only; manufacturing effects on resistance, capacitance, or both to include in the extraction results; wire-edge enlargement; erosion; and resistivity based on wire width.

All arguments that are available for this command can be set as defaults using environment variables. When set, the environment variable settings override the command defaults and do not need to be given as command line arguments. The environment variables are saved to the scheme settings file and can be restored as defaults in a next session.

A goal of timing analysis is to verify that a design meets timing requirements under a specified set of timing constraints, such as arrival and departure times, operating conditions, slew rates, and path delays. Timing analysis results can be used to fine tune time-critical nets in a design, and to evaluate the effect of optimizations by comparing before and after timing and optimization results.

In an exemplary aspect, timing analysis flow is preceded by opening a design. Then, timing is initialized by reading a timing library and reading timing constraints as well as associating timing libraries with physical libraries. For example, a read dotlib command can be used to read Synopsys Library files containing timing models provided by the vendor.

Following an extraction technology file is utilized to initialize the extractor. Then, the nets are extracted by the extractor, resulting in a timing report for analysis.

A report timing command can be used to analyze timing and generate a timing report. The timing report provides information about the various paths in the design, using valid columns such as arc, arrival, cell, delay, direction, edge, incr_delay, instance, instance_location, load, net, phase, pin, pin_location, required, and slew.

A format argument can be used to customize the reports by requesting the exact fields of interest. In addition, a combination of the format and TCL list arguments can be used to integrate the timing reports into TCL scripts. A "from" argument can be used to limit the number of paths reported, and to find specific paths in the design.

The reports typically contain data on the delay through the entire path. The start node and the end node of each path are identified. For example, the report can contain the following information: the slack times of the arriving signal at the end node; the start node; the associated transitions; the signal required times and the actual signal arrival times; any phase shifts applied when evaluating timing checks; and any Clock Path Pessimism Removal (CPPR) values applied to timing check evaluation.

Figure 2:
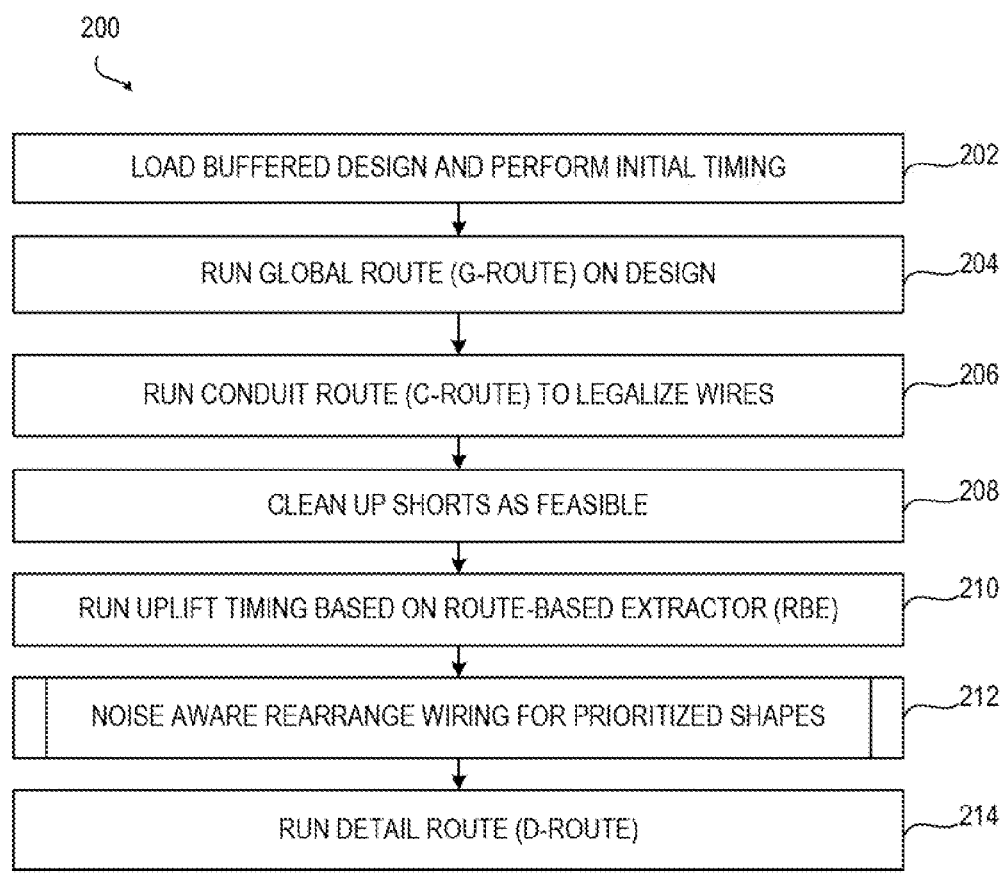
FIG. 2 provides a flow diagram illustrating a methodology for noise aware routing in an integrated circuit design, according to one or more embodiments.

Turning now to FIG. 2, which provides a methodology 200 for finalizing wiring in a buffered design that includes noise aware rearranging of wiring for prioritized shapes. A buffered design is loaded and initial timing is performed (block 202). Global routing ("G-route) is run on the design (block 204). Conduit routing ("C-route") is run on the design to legalize wires (block 206). Shorts are cleaned up as feasible (block 208). Uplift timing is run based on a route-based extractor to identify a list of nets with identified coupling between aggressors and victims (block 210). Based on this analysis, noise aware rearranging of the wiring is performed for prioritized shapes to mitigate coupling (block 212). With the routing improved, detail routing is run (block 214).

In an exemplary aspect, a space-based router and chip optimizer routing flow includes the following steps:
(a) Preparation, which involves setting constraints, or rules, and options for features such as blockages, tapering, and net priorities, to customize your environment;
(b) Global Route, which replaces all opens (open circuit traces) with global routes and re-routes to reduce congestion;
(c) Detail Route, which completes the routing of all nets and resolves violations; and
(d) Post-Route Refinement, which fixes some violations, re-routes short connections, and removes unnecessary vias.

The space-based router and chip optimizer global router replaces all opens (open circuit traces) with global routes and reduces congestion so that the resulting interconnection closely approximates a legally routed design. The information from the global router can be used to seed the detailed routing stages and provide a good estimation of the detailed routes.

To localize congestion problems, the design is divided into uniform square areas, called global routing cells, or gcells. Three types of gcells are identified: cell gcells, which occupy an area of the design; edge gcells, which represent the region between two cell gcells on the same layer; and down-via gcells, which represent the region between two cell gcells on different layers.

A gcell is over-congested if the routing demand exceeds its available resources. The number of over-congested gcells is a factor in determining whether the design can be routed without design rule violations. While the goal for the global router is to have no over-congested gcells, due to a variety of approximations and abstractions, it can be possible to route the design when some gcells are over-congested.

The global router runs a sequence of passes, with a congestion analysis run at the start and end of each pass. In the first pass, the congestion analysis divides the design into gcells and analyzes the gcells to determine their blockages and capacity. Following this analysis, the router updates the net connectivity of the design, creating guides where opens occur. Next, the router replaces the guides with global routes comprised of route segments and vias. Finally, the router will re-route global routes to reduce congestion in over-congested gcells. Detailed routes are not modified, but portions of detailed routes can be deleted to remove antennas (dangling routes). For each pass, the routing summary reports guide lengths and wire lengths for detailed and global routes. The congestion summary reports the number of gcells by layer and gcell type, and the number of over-congested gcells.

The space-based router and chip optimizer global router differs from other global routers in several ways. First, the space-based router and chip optimizer global router uses a detailed routing representation that provides very accurate estimations for via counts and wire lengths. Global routes behave exactly like detailed routes, but global routes can contain shorts. Second, the router uses a sophisticated resource model that accurately measures resource usage and demand, which allows the router to handle incremental net list changes without excessive detouring. Finally, the router is built to be incremental in every way. Besides simply and naturally completing net list changes, the space-based router and chip optimizer global router can work off of pre-routed designs containing any mixture of global routes, detailed routes, and guides.

In the local route step, space-based router and chip optimizer adds pin escapes. In the conduit route (C-route) step, space-based router and chip optimizer assigns tracks for the globally routed design and, guided by the global routes, lays down as many wires as possible along routing conduits. On completion of the local route step, guides indicate where connections will need to be completed in the detail route stage. Space-based router and chip optimizer strives to make these guides short in length and ensure that spacing violations can be subsequently corrected.

During detail routing, space-based router and chip optimizer runs multiple passes in cycles to complete the routing of all nets and resolve violations. The initial passes of cycle 1 attempt to connect all of the unroutes and resolve certain violations (e.g., different net and same net spacing, minimum area, grids and weak connects). Subsequent routing passes modify the routed wiring using rip-up and retry methods that strive to continuously improve overall results.

Additional cycles deal with any remaining DRC (Design Rule Checks) violations including same net violations, minimum width, minimum area and minimum enclosed area violations.

Figure 3:
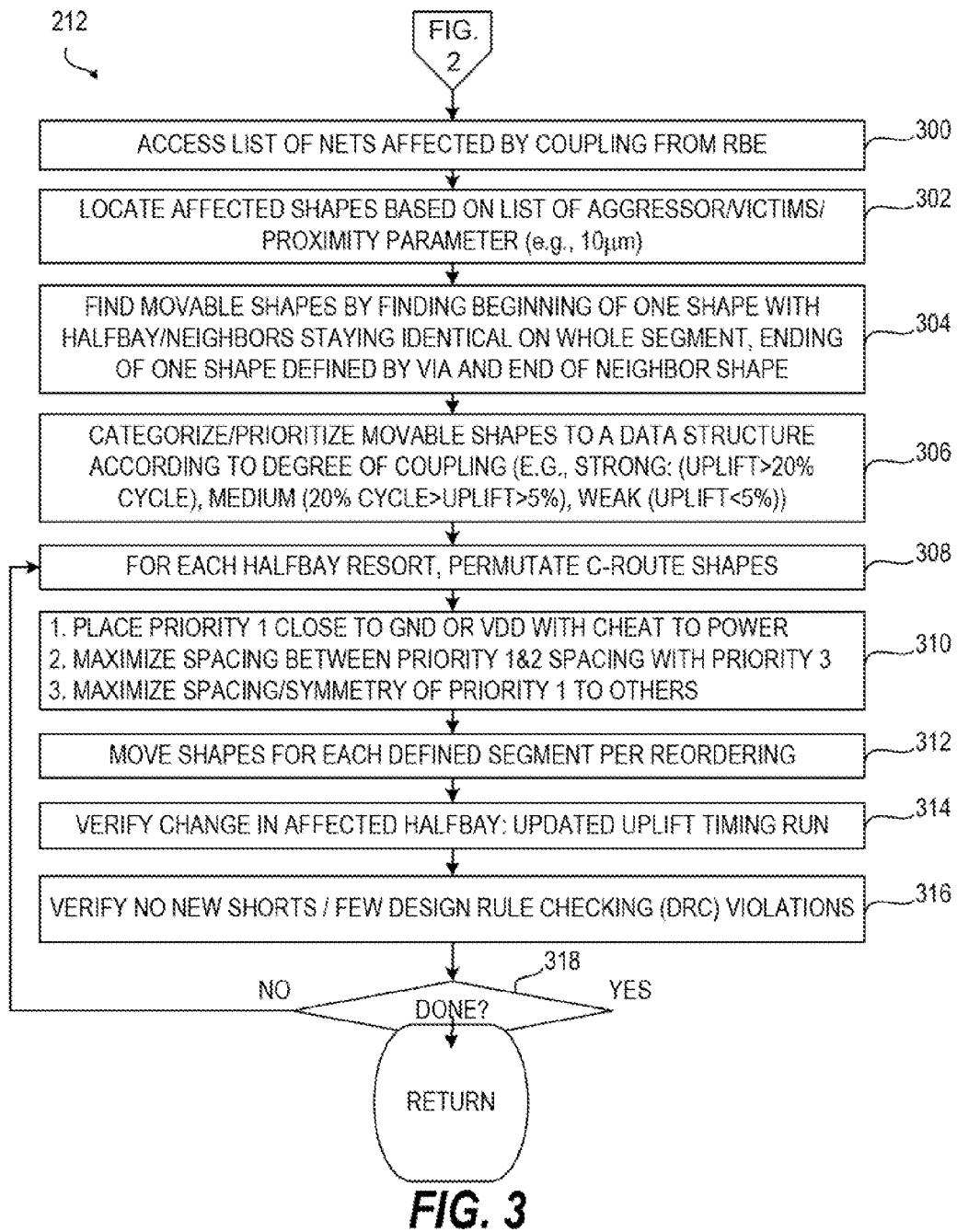
FIG. 3 provides a flow diagram illustrating a methodology for noise aware rearranging of the wiring to mitigate coupling for the method of FIG. 2, according to one embodiment.

In FIG. 3 depicts an exemplary embodiment for performing processes of block 212 (FIG. 2) is depicted. A rearranging system accesses a list of nets affected by coupling produced by the RBE (block 300). The rearranging system finds affected shapes based on the list of aggressors/victims that are within a proximity parameter (e.g., 10 μm) (block 302). The rearranging system finds affected shapes of nets that are moveable and are in one halfbay (block 304). The rearranging system sections shapes by (1) changes or ends of neighbor shapes, (2) original shape ends, (3) junk shape, and (4) vias. The rearranging system categorizes and prioritizes the movable shapes according to the coupling found by the uplift analysis (block 306). For example, the rearranging system assigns a first priority for strong coupling, such as greater than 20% cycle. The rearranging system assigns a second priority for medium coupling, such as between 5% and 20% cycle. The rearranging system assigns a third priority for low or weak coupling below 5% cycle. The rearranging system utilizes uplift timing analysis to calculate the influence of noise on timing behavior. The rearranging system correlates these values to the total cycle time of a processor or circuit design. Depending on the design requirements, the rearranging system has to meet noise limits to reach cycle time or timing limits. The rearranging system correlates timing uplift with the cycle time due to noise in order to for prioritize or categorize the affected candidates into buckets of certain values. The rearranging system takes first the signal wires of the worst bucket for rearrangement.

For each half bay resort or segment identified, a permutation is made for the moveable shapes, using c-route to change an ordering and spacing (block 308). In particular, a first priority shape is placed close to a ground or power stripe with a cheat to power. Cheat to power means that signal wires can be placed closer to power than to any other switching signal. This is due to the fact that power is a steady signal and has no switching. Power lines shield critical noise sensitive signals at one side. A second priority shape is spaced away from the first priority shape a maximum distance as possible or separated by a third priority shape. Thus, first priority shapes are given a maximum of available spacing as compared to other priority shapes or spacing is maximally symmetric (block 310). Rearranging occurs by moving shapes for each defined segment according to the previous re-ordering, such as by moving a shape or deleting and regenerating the shape (block 312). The change is verified with an updated uplift timing run to confirm that no degradation results (block 314). As segments of a certain signal routing are changed/rearranged with others, the achieved improvement has to be verified. The gaps in between the originally connected wire segments are of minor influence. The width of a gap is at most the width of a halfbay and thus can be neglected. After rearrangement, another RBE run can be started followed by a new uplift timing analysis. The last and final verification is performed after detailed routing (D-route). Then all signal wires are connected. However, D-route is time consuming and thus this final verification is generally not frequently executed. After rearranging of noisy signal wire segments, RBE and uplift timing analysis is repeated as often as there are fixable problems left. This is accompanied by DRC (Design Rule Checks) to verify if rules are violated. Otherwise, the change is reversed and the next step in the iteration is performed. Verification is made that no new shorts has been introduced and that few design rule checking (DRC) violations have resulted from the rearranging (block 316). A determination is made if further moveable shapes are to be reordered (block 318). If so, processing returns to block 308.

FIG. 4 provides results an example of results 400 of uplift timing analysis based upon RBE that provides a coupling value "DDelay".

Figure 5:
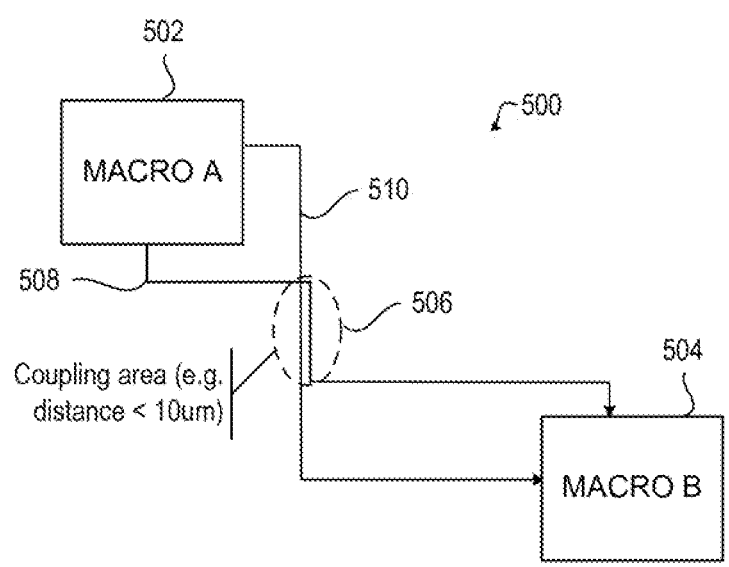
FIG. 5 provides a block diagram of an example partial electrical circuit illustrating locating affected shapes macros within a given set of routing of electrical circuits.

FIG. 5 illustrates an example partial electrical circuit 500 comprises two identified nets, depicted as MACRO A 502 and a MACRO B 504 having a portion 506 of respective traces 508, 510 that satisfies the proximity parameter (e.g., coupling area defined as a distance less than 10 μm). FIG. 5 shows two portions of a schematic connected by two signals. In layout, both signal have a common halfbay where these two segments are closely adjacent to each other. The adjacent segment length exceeds the length of a certain limit (e.g. 10 um). Switching behavior is such that a rising signal on one wire is affected by a falling signal slope on the other. Segments that susceptible to noise require identification by an extractor.

Figure 6A:
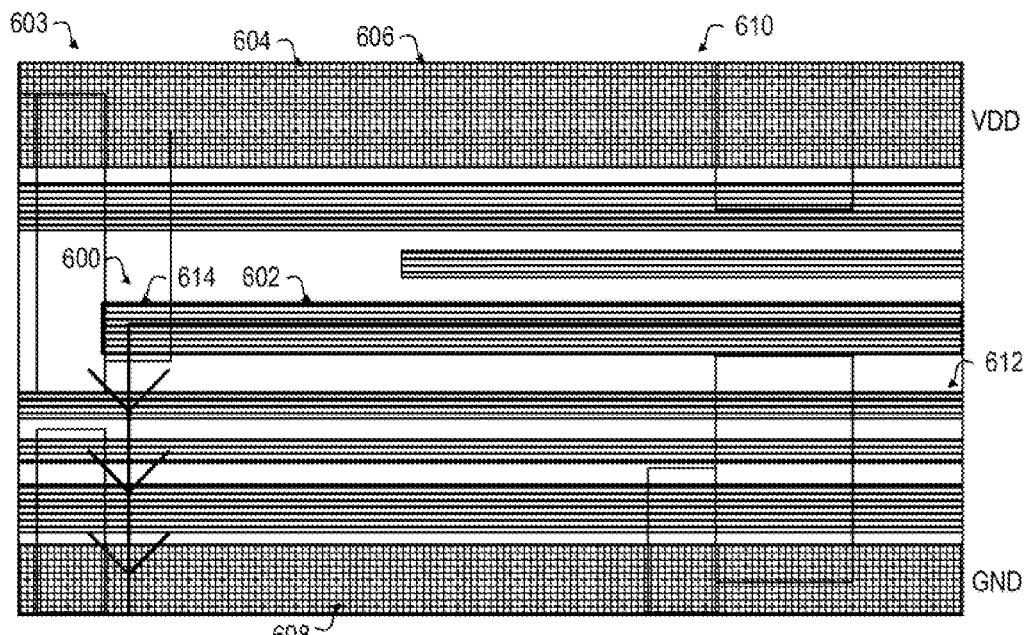
FIGS. 6A-6B provides a top view diagram of a portion of a halfbay and neighboring shapes.
Figure 6B:
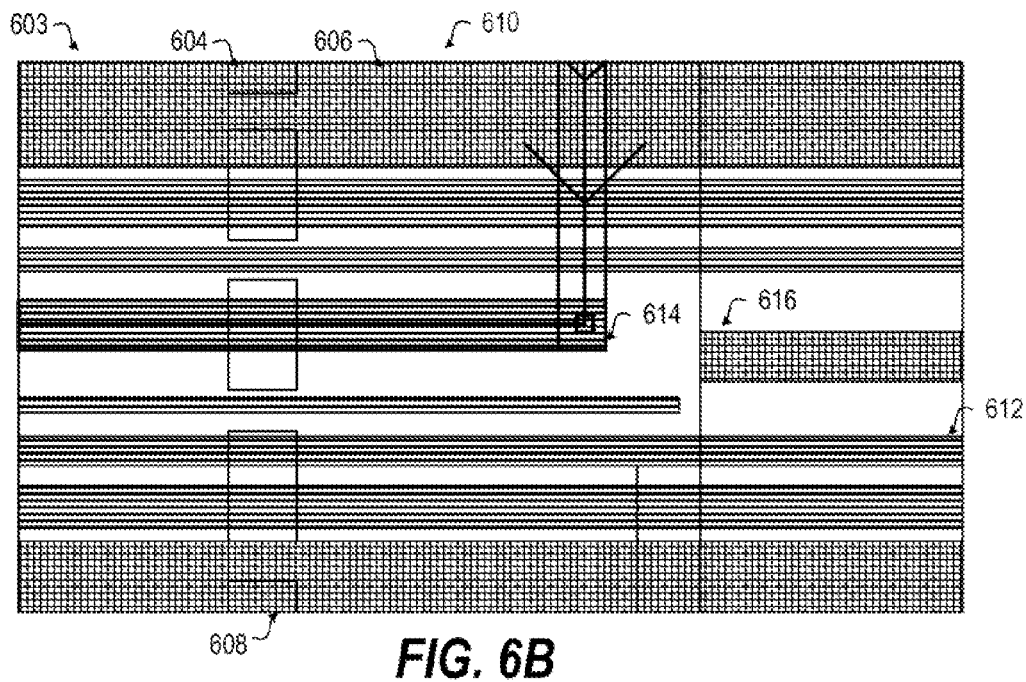

To this end, FIGS. 6A-6B depict a placed-and-routed design 603 that requires extracting shapes for rearranging. The rearranging system finds the length of direct neighborhood of two signals running in parallel in one halfbay. The start and end of a segment is defined by vias. A via defines a contact to the next lower or higher orthogonal wiring level and thus the start/end of a segment. To calculate the maximum length of direct neighborhood of two adjacent wire segments the minimum/maximum x coordinates of both wire segments have to be taken into consideration with an orthogonal wiring level given by they coordinate, respectively.

FIGS. 6A-6B In FIG. 6A, the beginning 600 of first shape 602 in the placed-and-routed design 603. A halfbay 604 defined between a ground stripe and a power stripe is selected as having a segment 610 wherein the first shape 602 and neighboring shapes 612 are identical along the segment 610. The first shape 602 and neighboring shapes 612 are parallel and not necessarily of the same thickness. An ending of the first shape 602 is defined by via 614 and end of a particular neighbor shape 616. On top and bottom there are the gnd and vdd power lines (marked by grid pattern). Both lines must have the same width.

In one aspect, the strategy for rearranging critical wires is as follows: First move priority one (1) wire segments close to vdd/gnd, thereby moving a portion of a net with priority two (2) or higher away from gnd or vdd. This is the case if the halfbay is densely populated. If a halfbay is not densely populated, enlarging the spacing between wires might achieve a sufficient improvement. The rearranging cannot always guarantee a solution. If all signals and wire segments fall into priority one (1), for instance, a rearrangement might have no effect. It can therefore be advisable to verify the solution by a further iteration with RBE and uplift timing analysis.

Figure 7:
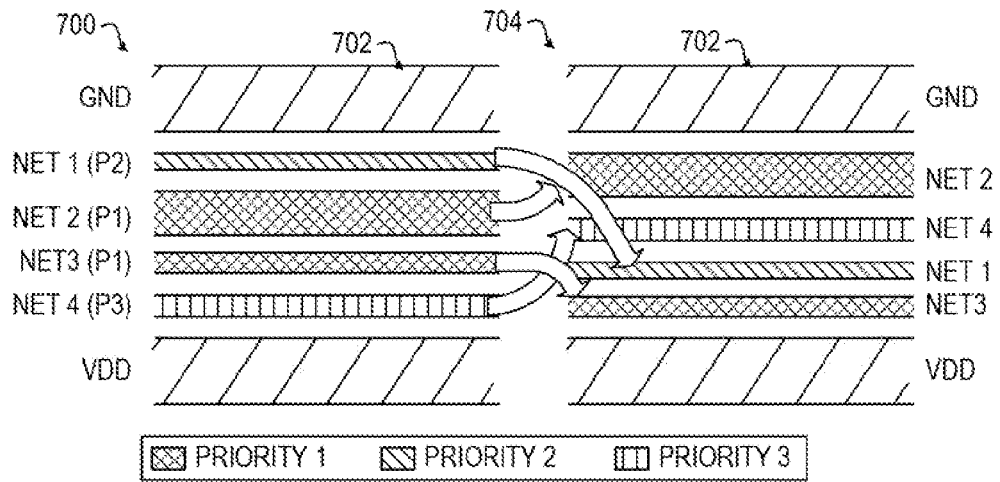
FIGS. 7-9 provide block diagrams of three examples of rearranging a segment of a halfbay and neighboring shapes for noise mitigation, according to one or more embodiments.

In FIG. 7, a first example 700 is provided of a half bay 702 of a GND and VDD having therebetween a NET 1 of priority 2, a NET 2 of priority 1, a NET 3 of priority 1, and a NET 4 of priority 3. After using the rearranging permutation, the result 704 from GND to VDD is NET 2, NET 4, NET 1, and NET 3.

Figure 8:
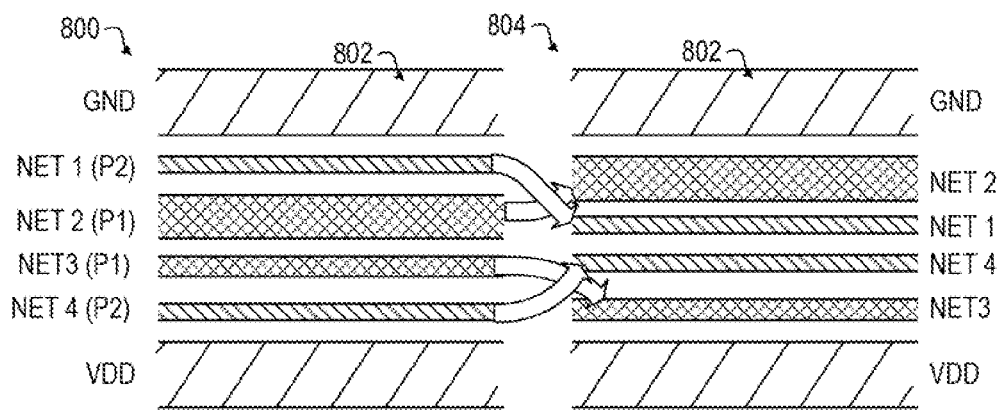

In FIG. 8, a second example 800 is provided of a half bay 802 of a GND and VDD having therebetween a NET 1 of priority 2, a NET 2 of priority 1, a NET 3 of priority 1, and a NET 4 of priority 2. After using the rearranging permutation, the result 804 from GND to VDD is NET 2, NET 1, NET 4, and NET 3.

Figure 9:
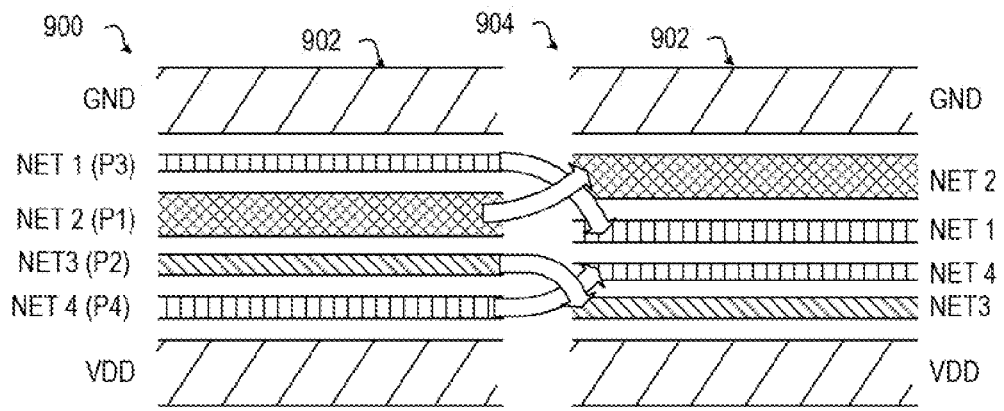

In FIG. 9, a third example 900 is provided of a half bay 902 of a GND and VDD having therebetween a NET 1 of priority 3, a NET 2 of priority 1, a NET 3 of priority 2, and a NET 4 of priority 3. After using the rearranging permutation, the result 904 from GND to VDD is NET 2, NET 1, NET 4, and NET 3.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the innovation. Thus, while the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, aspects of the present innovation may be embodied as a system, method or computer program product. Accordingly, aspects of the present innovation may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present innovation may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present innovation may be written in any combination of one or more programming languages, including an object oriented programming language such as Java, Smalltalk, C++ or the like and conventional procedural programming languages, such as the "C" programming language or assembly level programming or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present innovation may be implemented using any combination of software, firmware or hardware. As a preparatory step to practicing the innovation in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the innovation. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the innovation may be practiced by combining one or more machine-readable storage devices containing the code according to the present innovation with appropriate processing hardware to execute the code contained therein. An apparatus for practicing the innovation could be one or more processing devices and storage systems containing or having network access to program(s) coded in accordance with the innovation.

Thus, it is important that while an illustrative embodiment of the present innovation is described in the context of a fully functional computer (server) system with installed (or executed) software, those skilled in the art will appreciate that the software aspects of an illustrative embodiment of the present innovation are capable of being distributed as a program product in a variety of forms, and that an illustrative embodiment of the present innovation applies equally regardless of the particular type of media used to actually carry out the distribution.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A computer-implemented method for noise aware routing in an integrated circuit chip design, the computer-implemented method comprising:
   a logic system performing an uplift timing analysis using a route-based extractor for a given routed placement of nets connecting electric circuits of an integrated circuit chip design;
   the logic system locating one or more affected shapes in a halfbay between a ground stripe and a power stripe based on a list of aggressor and victim nets and a proximity parameter;
   the logic system prioritizing the one or more affected shapes into different priorities based on one or more coupling uplift values associated with the one or more affected shapes from the uplift timing analysis and correlating, for the one or more affected shapes, timing uplift with cycle time due to noise;
   the logic system giving a higher priority to shapes having a higher coupling uplift value; and
   the logic system rearranging the affected shapes within the integrated circuit chip design according to the respective priority to create an optimized integrated circuit chip design.

2. The method of claim 1, wherein rearranging the affected shapes further comprises placing a higher priority shape closer to one of a ground trace and a power trace than a lower priority shape.

3. The method of claim 1, wherein:
   rearranging the affected shapes further comprises placing a lower priority shape in between two higher priority shapes; and
   the affected shapes are rearranged in order to meet at least one of: one or more timing limits and one or more noise limits to reach cycle time.

4. The method of claim 1, wherein rearranging the affected shapes further comprises:
   placing a first priority shape adjacent to a first of the ground stripe and the power stripe;
   placing a second priority shape adjacent to a second of the ground stripe and the power stripe; and
   separating the first priority shape from the second priority shape by one of any third priority shape or a maximum distance.

5. The method of claim 1, further comprising:
   the logic system utilizing the uplift timing analysis to calculate an influence of noise on timing behavior; and
   the logic system correlating the plurality of uplift values to a total cycle time of the integrated circuit design;
   wherein rearranging the affected shapes further comprises:
      iteratively moving a selected affected shape according to the priority to generate an updated routed placement of nets;
      performing an uplift timing analysis based upon the updated routed placement of nets; and
      restoring the updated routed placement of nets to a prior state in response to results of the uplift timing analysis indicating an increase in a quantity of noise coupling between macros of the integrated circuit chip design.

6. The method of claim 1, wherein locating the affected shapes further comprises the logic system selecting a the halfbay having a segment wherein a first shape and a plurality of neighboring shapes parallel to the first shape are identical down a length of the segment.

7. The method of claim 1, wherein categorizing the affected shape further comprises assigning a first priority for strong coupling greater than a first cycle, a second priority for medium coupling between the first cycle and a second cycle, and a third priority for low coupling less than the second cycle.

8. A data processing system for noise aware routing in an integrated circuit chip design, the data processing system comprising:
   a processor;
   a computer-readable storage device that stores given routed placement of nets connecting electric circuits of an integrated circuit chip design; and
   a system that executes on the processor and causes the data processing system to:
      perform an uplift timing analysis using a route-based extractor for the given routed placement of nets,
      locate one or more affected shapes in a halfbay between a ground stripe and a power stripe based on a list of aggressor and victim nets and a proximity parameter;
      prioritize the one or more affected shapes into different priorities based on one or more coupling uplift values associated with the one or more affected shapes from the uplift timing analysis and correlating, for the one or more affected shapes, timing uplift with cycle time due to noise;
      give a higher priority to shapes having a higher coupling uplift value; and
      rearrange the affected shapes within the integrated circuit chip design according to the respective priority to create an optimized integrated circuit chip design.

9. The data processing system of claim 8, wherein the system further causes the data processing system to rearrange the affected shapes by placing a higher priority shape closer to one of a ground stripe and a power stripe than a lower priority shape.

10. The data processing system of claim 8, wherein:
   the system further causes the data processing system to rearrange the affected shapes by placing a lower priority shape in between two higher priority shapes; and the affected shapes are rearranged in order to meet at least one of: one or more timing limits and one or more noise limits to reach cycle time.

11. The data processing system of claim 8, wherein the system further causes the data processing system to provide the function of rearranging the affected shapes by:
   placing a first priority shape adjacent to a first of the ground stripe or the power stripe,
   placing a second priority shape adjacent to a second of the ground stripe or the power stripe, and
   separating the first priority shape from the second priority shape by one of any third priority shape or a maximum distance.

12. The data processing system of claim 8, the system further causes the data processing system to:
   utilize the uplift timing analysis to calculate an influence of noise on timing behavior; and
   correlate the plurality of uplift values to a total cycle time of the integrated circuit design;
   wherein the system further causes the data processing system to rearrange the affected shapes by:
      iteratively moving a selected affected shape according to the priority to generate an updated routed placement of nets;
      performing an uplift timing analysis based upon the updated routed placement of nets; and
      restoring the updated routed placement of nets to a prior state in response to results of the uplift timing analysis indicating an increase in a quantity of noise coupling between macros of the integrated circuit chip design.

13. The data processing system of claim 8, wherein the system further causes the data processing system to locate the affected shapes by selecting a the halfbay having a segment wherein a first shape and a plurality of neighboring shapes parallel to the first sham are identical down a length of the segment.

14. The data processing system of claim 8, wherein the system further causes the data processing system to categorize the affected shape by assigning a first priority for strong coupling greater than a first cycle, a second priority for medium coupling between the first cycle and a second cycle, and a third priority for low coupling less than the second cycle.

15. A computer program product for noise aware routing in an integrated circuit chip design, the computer program product comprising:
   a computer usable storage device; and
   program code embedded on the computer usable storage device that when executed by a processor of a data processing system causes the processor of the data processing system to perform functions of:
      performing an uplift timing analysis using a route-based extractor for a given routed placement of nets connecting electric circuits of an integrated circuit chip design;
      locating one or more affected shapes in a half bay between a ground stripe and a power stripe based on a list of aggressor and victim nets and a proximity parameter;
      prioritizing the one or more affected shapes into different priorities based on one or more coupling uplift values associated with the one or more affected shapes from the uplift timing analysis and correlating, for the one or more affected shapes, timing uplift with cycle time due to noise;
      giving a higher priority to shapes having a higher coupling uplift value; and
      rearranging the affected shapes within the integrated circuit chip design according to the respective priority to create an optimized integrated circuit chip design.

16. The computer program product of claim 15, wherein the program code further includes code for rearranging the affected shapes by placing a higher priority shape closer to one of a ground stripe and a power stripe than a lower priority shape.

17. The computer program product of claim 15, wherein:
   the program code further includes code for rearranging the affected shapes by placing a lower priority shape in between two higher priority shapes; and
   the affected shapes are rearranged in order to meet at least one of: one or more timing limits and one or more noise limits to reach cycle time.

18. The computer program product of claim 15, wherein the program code further includes code for rearranging the affected shapes by:
   placing a first priority shape adjacent to a first of the ground stripe and the power stripe;
   placing a second priority shape adjacent to a second of the ground stripe and the power stripe; and
   separating the first priority shape from the second priority shape by one of any third priority shape or a maximum distance.

19. The computer program product of claim 15, the program code further causing the processor of the data processing system to perform the functions of:
   utilizing the uplift timing analysis to calculate an influence of noise on timing behavior; and
   correlating the plurality of uplift values to a total cycle time of the integrated circuit design;
   wherein the program code further includes code for rearranging the affected shapes by:
      iteratively moving a selected affected shape according to the priority to generate an updated routed placement of nets;
      performing an uplift timing analysis based upon the updated routed placement of nets; and
      restoring the updated routed placement of nets to a prior state in response to results of the uplift timing analysis indicating an increase in a quantity of noise coupling between macros of the integrated circuit chip design.

20. The computer program product of claim 15, wherein:
   the program code for locating the affected shapes further comprises code for selecting the halfbay having a segment wherein a first shape and a plurality of neighboring shapes parallel to the first shape are identical down a length of the segment; and
   the program code for categorizing the affected shape further comprises code for assigning a first priority for strong coupling greater than a first cycle, a second priority for medium coupling between the first cycle and a second cycle, and a third priority for low coupling less than the second cycle.

* * * * *